Patented May 8, 1945

2,375,186

UNITED STATES PATENT OFFICE 2,375,186

FLOSS FIBER LIBERATION

Boris Berkman, Chicago, Ill., assignor to Milkweed Products Development Corporation, Chicago, Ill., a corporation of Illinois No Drawing. Application June 1, 1942, Serial No. 445,380

5 Claims. (Cl. 19—1)

My invention relates to the liberation of floss from pods and seeds of the milkweed plant and the kapok tree. The milkweed and kapok pods are generally similar. They have approximately the same shape, but the kapok pod is somewhat the larger. In each instance a floss cluster is fastened to one end of a seed by a neck to which the individual floss fibers adhere. This neck is much thicker than the floss fiber and when the pod is in its normal damp uncured condition, the neck has sufficient strength to resist separation between the floss cluster and seed. Under some conditions, however, the neck loses much of its strength and is easily broken.

In the course of my research upon the problem of separating milkweed and kapok floss and seeds, I have found that the problem resolves itself very largely into devising a method or methods for breaking the before-mentioned neck.

It is, therefore, the principal object of the present invention to devise a novel method for rupturing the neck which joins milkweed or kapok floss to its seed.

Another object of the present invention is to devise a novel method for removing milkweed or kapok seeds from their attached floss without damage to either the floss or the seeds.

Another object of the present invention is to accomplish removal of the milkweed or kapok floss from the attached seeds without damage to the floss and while improving the germination qualities of the seeds.

Yet another object of the present invention is to remove milkweed or kapok flosses from their seeds within the milkweed or kapok pods without destroying the valuable properties for which the pods are useful.

Still another object of the present invention is to flatten and thus substantially destroy the neck which joins a milkweed or kapok seed to its floss without damage to the floss fibers or seeds.

Still another object of the present invention is to substantially destroy the flexibility of the neck connecting seeds and floss.

Another object of the present invention is to devise a novel method for treating milkweed or kapok pods which will bring about a sufficient weakening of the neck joining the seeds and floss within the pod so that easy separation of the floss and seeds can be accomplished by means of a gentle air blast.

Another object of the present invention is to accomplish all of the above-mentioned objectives without requiring that the pods to be treated be dehydrated below approximately 40% moisture by weight.

Other objects and advantages will become apparent from the following description of alternative preferred embodiments of my invention.

Essentially, the pods comprise a tough horny fibrous shell formed in two halves. These shells have a soft silky lining which admirably protects the delicate floss fibers. The seeds and attached floss are located within these pods and under proper conditions of humidity the pods split open, at least partially, thus permitting the seeds and attached floss to be air borne.

Any method for separating milkweed seeds from their attached floss clusters must, in order to be successful, accomplish this separation without damaging the valuable silky fibers. The floss fibers are quite elastic and may be considered as very fine tubes about an inch or an inch and a quarter long, closed at one end. They are very thin, being only about one-half the diameter of the human hair.

Until now, methods of separating the floss and seeds have depended to a great extent upon dehydration of the pods to a moisture content of between 20 and 30 per cent. by weight. After the pods have been dried, they may be opened by an agitation process which is described in my United States Letters Patent No. 2,223,543, issued December 3, 1940, and 2,233,156, of February 25, 1941, and in my copending application Serial No. 443,086, filed May 18, 1942. The methods described in these patents and patent application are extremely successful and a perfect separation of floss seeds and pod shells results, but the demand for a faster commercial process has led me to seek a short-cut in the prior methods.

The prior methods forming the subject matter of the before-mentioned patents and application, have a feature in common which I have tried to avoid in the process forming the subject matter of the present application. The step referred to is the one which required removal of the floss and seeds from the pods before separation of the floss and attached seeds. It will be appreciated that if the necks joining the seeds to their floss clusters can be broken before the pods are agitated to remove the seeds and floss from the pods, this neck breaking step will not have to be accomplished at a later point in the cycle and, therefore, air-borne flotation of the floss may be accomplished directly without the floss incurring danger of damage.

I have found that the silky inner lining of the pods admirably protects the floss fibers and that the fibers cushion each other sufficiently so that enormous pressures (in fact air pressures of the order of 40,000 pounds per square inch can be brought to bear upon the pods without danger of the floss suffering damage). I have also found that comparatively high pressures seriously damage the necks joining the seeds to their floss clusters.

One method which I have devised and which is based upon this discovery is to permit the pods to dry to a moisture content of 40% by weight or less and then pass the pods between revolving, substantially non-resilient rollers which preferably have a gap opening therebetween considerably less than the average pod thickness and which preferably revolve at different peripheral speeds, so that a shearing action is incurred between the pod shells simultaneously with a direct application of pressure upon the pods. Preferably also, one of the rolls should oscillate axially relative to the other, thus still further enhancing the shearing action.

As nearly as I can determine, the action which ensues is about as follows:

The direct application of pressure flattens the necks joining the milkweed and kapok seeds to their floss groups—it probably also flattens the floss fibers somewhat but the latter have sufficient resiliency to return to their original dimensions, whereas the necks do not have this resiliency and thus remain in a weakened condition. Substantially simultaneously, the wringing action brought about by the difference in the peripheral velocities of the two rollers causes relative motion between the floss fibers and seeds, the seeds being centrally located substantially along the axis of the pod, whereas the fibers are disposed more or less in a C-shaped space around the seeds. The relative motion thus produced effects a complete rupture of the necks, thus leaving the fibers and seeds in separate groups within the partially crushed pods. When the pods emerge from between the rollers, the two shells comprising the pod covering are usually completely separated and, if not separated, the pods are at least completely opened so that the floss may be easily separated from the pods and seeds by air flotation.

I have found that this process does not damage the floss and that the germination of the seeds, if anything, is improved. Probably this is accomplished by the slight flattening of the seeds which takes place during their passage between the rollers.

Although I have found rollers to be very effective for accomplishing the above purpose, while having the added advantage of being well-adapted for operation in a continuous cycle, I have also found that direct press action upon a mass of milkweed pods or subjecting the pods to air pressure within a chamber accomplishes a similar effect.

Another method for accomplishing breakage of the necks which join the seeds to their floss clusters which I have found to be effective is to subject the pods to a subfreezing temperature for a sufficient time to substantially completely freeze the pods. This freezing action takes place throughout the pod but appears to have little effect upon the strength of any of the pod elements with the exception of the necks which join the floss to the seeds and the juncture between the two pod shells. The frozen pods thus tend to split open more easily, thereby simplifying the step of removing the floss from the pods by air flotation. One additional advantage gained by this process is that the germination of the seeds is enormously increased by the freezing step.

It will be seen that essentially the three embodiments of the invention described are similar in that all of these embodiments are processes for effecting the separation between milkweed and kapok seeds and their floss clusters before the seeds and floss are removed from the pods and, further, that this separation is accomplished by disintegrating the necks which join the seeds and floss without damaging the floss fibers or seeds.

Having described my invention, what I claim as new and useful and desire to secure by Letters Patent of the United States is:

1. The method of separating floss and seeds of the milkweed or kapok plants which comprises drying the pods to a moisture content of not more than approximately 40% moisture by weight, and compressing said pods while producing a shearing action upon said pods so as to cause relative motion between the floss and the seeds.

2. The method of separating floss and seeds of the milkweed or kapok plants which comprises drying the pods to reduce the moisture content to approximately 40% moisture by weight or less, compressing said pods while producing a shearing action upon the pods to cause relative motion between the floss and seeds while the floss and seeds remain within the protection of the pod shells so as to weaken the necks which join the floss and seeds, and effecting separation of the pod components by air flotation after said treatment.

3. The method of separating floss and seeds of the milkweed or kapok plants which comprises passing the pods between crushing rollers, causing said rollers to revolve at different peripheral velocities, such treatment imparting a shearing action to the pods to cause relative motion between the floss and seeds, thereby weakening or rupturing the necks which join the seeds to their floss clusters, and separating the pod components after said crushing operation.

4. The method of separating floss and seeds of the milkweed or kapok plants which comprises passing the pods between crushing rollers, oscillating one of said rollers axially relative to the other crushing roller, such treatment imparting a shearing action to the pods to cause relative motion between the floss and seeds, thereby weakening or rupturing the necks which join the seeds to their floss clusters, and separating the pod components after said crushing operation.

5. The method of separating floss and seeds of the milkweed or kapok plants which comprises passing the pods between crushing rollers, causing said rollers to revolve at different peripheral velocities, oscillating one of said rollers axially relative to the other crushing roller, such treatment imparting a shearing action to the pods to cause relative motion between the floss and seeds, thereby weakening or rupturing the necks which join the seeds to their floss clusters, and separating the pod components after said crushing operation.

BORIS BERKMAN.